2,712,022

Patented June 28, 1955

2,712,022

HETEROCYCLIC AMINO ALCOHOLS

Donald Wallace Adamson, London, England, assignor to Burroughs Wellcome & Co. (U. S. A.), Inc., Tuckahoe, N. Y., a corporation of New York No Drawing. Application July 16, 1949, Serial No. 105,257

Claims priority, application Great Britain July 20, 1948

9 Claims. (Cl. 260—296)

The present invention relates to the preparation of novel aryl substituted tertiary aminocarbinols and to the dehydration of these derivatives to the corresponding unsaturated and saturated amines. Many of these derivatives are found to have outstanding medicinal properties in veterinary and human medicine, while others are useful intermediaries in the preparation of related compounds.

According to the present invention the new derivatives may be represented by the formula

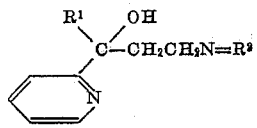

wherein $R^1$ denotes a radical selected from the class consisting of the phenyl, thienyl, p-chlorophenyl and p-methoxyphenyl radicals and $NR^2$ is a radical selected from the class consisting of the dimethyl, diethyl, piperidino and pyrrolidino radicals and are prepared by bringing about a reaction between an aminoethyl ketone of the formula $$R^1COCH_2CH_2N=R^2$$

wherein $R^1$ and $R^2$ have the above mentioned values with the appropriate pyridyl lithium reagent and thereafter hydrolyzing the organo-lithium compound so produced.

The reaction is preferably carried out according to the invention by forming a solution or suspension of the organo-lithium compound in an inert solvent, usually ether, and bringing this into reaction with the aminoethyl ketone by mixing the reactants together in an inert atmosphere and stirring for a short period preferably while cooling. The organo-lithium complex so formed is decomposed by the addition of water followed by an acid such as acetic or hydrochloric acid. The acidic aqueous layer is separated and made alkaline and the basic product extracted by a solvent such as chloroform.

On removing the solvent the product is purified either by distillation under reduced pressure or by crystallization and may be converted, if desired, into water soluble salts by treatment with an acid. The aminoethyl ketones used in the above described reaction are known compounds. The new derivatives may be used either in the form of the base or a water soluble salt thereof such as the hydrochloride. The non-toxic acid used to form the salt is immaterial insofar as the physiological activity of the substance is concerned and is not of a critical nature. Hydrochloric acid, hydrobromic acid, sulfuric acid, phosphoric acid or certain organic acids such as malic acid, succinic acid, lactic acid or the like may be employed and any of these may offer advantages in individual cases. All non-toxic acids are considered to be equivalent for this purpose and all salts thereof are comprehended within the invention.

In accordance with another phase of the present invention the substituted 1-(2'-pyridyl)-1-arylpropan-1-ols prepared in the foregoing manner are converted into the corresponding substituted aminopropenes by treatment with an agent to remove the elements of water in the following manner

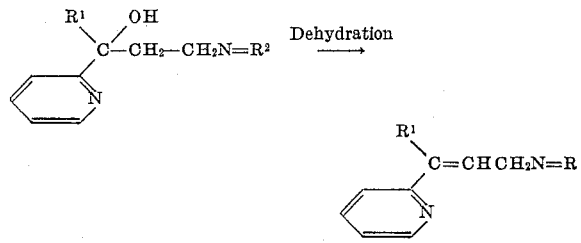

wherein $R^1$ and $R^2$ have the above mentioned values.

The conversion of the carbinol to the unsaturated amine may be effected by a variety of agents. It has been found satisfactory to add thionyl chloride to the carbinol dissolved in an inert solvent such as benzene or chloroform and then to boil the mixture under reflux on the steam-bath for two hours. The solvent and excess thionyl chloride are removed by evaporation, the residue dissolved in water, excess of an alkali, such as ammonia, added and the liberated base separated by extraction with a solvent such as ether or chloroform. The base may be recovered by evaporation of the solvent and is purified by distillation under reduced pressure, or, if the base is a solid, by recrystallization from a suitable solvent. Alternatively the carbinol may be dehydrated by warming with concentrated sulphuric acid of strength 80% by weight approximately, followed by basification and extraction as described above. The unsaturated amines so obtained may be converted to their crystalline, water-soluble salts, such as the hydrochlorides.

Further, according to the invention, the unsaturated amines of the above formula in which $R^1$ and $R^2$ have the same meaning as above except that $R^2$ must not be 2'-thienyl, may if desired be reduced to the corresponding saturated amines of the formula

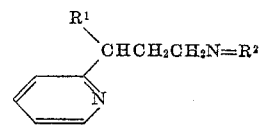

The reduction is carried out by agitating a solution of a salt, such as the hydrochloride of the unsaturated amine in, for example, ethanol or aqueous ethanol in the presence of a hydrogenation catalyst such as palladized charcoal in an atmosphere of hydrogen at room temperature or at elevated temperatures, at atmospheric pressure or at higher pressures. The product is isolated by filtering off the catalyst, evaporation of the solvent and recrystallization of the residual salt, or by basification and fractional distillation of the resulting base. The 1-(2'-pyridyl)-1-arylpropanes so obtained may be converted into water-soluble, crystalline salts of the type above indicated for the alcohols. The tertiary amino carbinols may be directly reduced to the corresponding amino propanes by treatment with phosphorus hydriodic acid thereby eliminating the intermediate formation of aminopropenes.

The compounds prepared according to this invention and salts thereof either have therapeutic properties or can serve as intermediate products for the manufacture of therapeutically-active substances. The aminopropenes and aminopropanes of the above indicated character have valuable antihistamic properties.

The following examples serve to illustrate the invention.

Example 1

The following process was conducted in a flask fitted with a stirrer and a reflux condenser and provided with an inlet tube through which a slow stream of dry nitrogen was passed in order to maintain an inert atmosphere.

Lithium (12 g.) was added to 1-chlorobutane (78 g.) dissolved in anhydrous ether (250 millilitres) and the mixture boiled under reflux with stirring until the lithium had dissolved. The solution was then cooled to −40° C. and a solution of 2-bromopyridine (100 g.) in anhydrous ether (100 ml.) gradually added with stirring. After stirring for ten minutes at this temperature, 3-dimethylaminopropiophenone (35 g., freshly distilled; Mannich and Heilner, Berichte, 1922, volume 55, page 356) dissolved in ether (50 ml.) was gradually added and the mixture stirred at −15° C. for 3 hours. The product was then poured on to ice (200 g.) with stirring and acetic acid added until the mixture was acidic. The aqueous layer was then separated, shaken with ether, again separated, and excess ammonia added. The oil which separated was extracted with chloroform, the extract washed with water, dried over sodium sulphate and the chloroform evaporated. The residual oil which solidified on cooling furnished pure 3-dimethylamino-1-(2'-pyridyl)-1-phenylpropan-1-ol (melting point 99–100° C.), after recrystallization from light petroleum (boiling point 60–80° C.). The oxalate, prepared by mixing ethanolic solutions of the base and of oxalic acid had melting point 151–153° C. (after being recrystallized from ethanol).

Example 2

Thionyl chloride (7.0 g.) in benzene (7 ml.) was added slowly to 3-dimethylamino-1-(2'-pyridyl)-1-phenylpropan-1-ol (7.5 g.) dissolved in benzene (25 ml.) cooled in ice. The mixture was then boiled under reflux on the steam bath for 2 hours. Benzene and excess thionyl chloride were removed by evaporation under reduced pressure, and the residue dissolved in water. Excess ammonia was then added and the liberated base extracted with chloroform. The chloroform extract was washed with water, dried over sodium sulphate and the chloroform evaporated. The residual oil on fractional distillation under reduced pressure, gave 3-dimethylamino-1-(2'-pyridyl)-1-phenylprop-1-ene, a pale yellow oil, having boiling point 108° C./0.05 millimetres. The monohydrochloride of the base had melting point 181–182° C. (when recrystallized from a mixture of ethanol and ethyl acetate).

Example 3

3-dimethylamino-1-(2'-pyridyl)-1-phenylprop-1-ene hydrochloride (5 g.) dissolved in ethanol (15 ml.) was shaken with palladized charcoal catalyst (2 g.) in an atmosphere of hydrogen. When absorption of hydrogen had ceased, the catalyst was filtered off, and the ethanol removed by evaporation. The residue was dissolved in water, excess of ammonia added, and the liberated base extracted by chloroform. The chloroform extract was dried by sodium sulphate, the chloroform removed by evaporation and the residual oil distilled under reduced pressure to give 3-dimethylamino-1-(2'-pyridyl)-1-phenylpropane, a colorless liquid, boiling at 104–106° C./0.05 mm. The neutral oxalate, prepared by mixing ethanolic solutions of the base and of oxalic acid, had melting point 154° C. (when recrystallized from ethanol).

Example 4

Lithium (2.2 g.) was added to 1-chlorobutane (13.8 g.) dissolved in anhydrous ether (80 ml.) contained in a flask fitted with a stirrer, reflux condenser and inlet-tube through which a slow stream of dry notrogen was passed. The mixture was boiled under reflux with stirring until the lithium had dissolved. The solution was then cooled to −40° C. and a solution of 2-bromopyridine (18 g.) in anhydrous ether (20 ml.) gradually added with stirring. After stirring for ten minutes at −40° C., 3-piperidino-p-chloropropiophenone hydrochloride (21.4 g.) was added in small portions. The temperature was then allowed to rise to −15° C. and stirring continued for 1 hour. The product was worked up by the method described in Example 1, yielding 3-piperidino-1-(2'-pyridyl)-1-p-chlorophenylpropan-1-ol.

Example 5

Dehydration of 3-piperidino-1-(2'-pyridyl)-1-p-chlorophenylpropan-1-ol by the method described in Example 2 gave 3-piperidino-1-(2'-pyridyl)-1-p-chlorophenylprop-1-ene.

Example 6

Beta-dimethylamino-4-methoxypropiophenone, when treated with 2-pyridyl-lithium in a manner essentially similar to that described in Example 1, yielded 3-dimethylamino-1-(4'-methoxyphenyl)-1-(2'-pyridyl)propan-1-ol, melting point 89–90° C. (after recrystallization from ethanol). The dihydrochloride prepared therefrom melted with decomposition at 208–209° C. (after recrystallization from a mixture of methanol and ethyl acetate).

Example 7

Thionyl chloride (1.4 ml.) in chloroform (5 ml.) was added slowly to 3-dimethylamino-1-(4'-methoxyphenyl)-1-(2'-pyridyl)propan-1-ol (2.6 g.) dissolved in chloroform (20 ml.) cooled to −20° C. The mixture was allowed to come to room temperature slowly and was then boiled under reflux for 2 hours. The solvent was then removed by evaporation, and the residual solid recrystallized from a mixture of ethanol and ethyl acetate. The product, 3-dimethylamino-1-(4'-methoxyphenyl)-1-(2'-pyridyl)prop-1-ene dihydrochloride, melted with decomposition at 206–208° C.

Example 8

Beta-dimethylaminopropiothienone when treated with 2-pyridyllithium in a manner essentially similar to that described in Example 1, yielded 3-dimethylamino-1-(2'-pyridyl)-1-1(2'-thienyl)propan-1-ol, melting point 66–67° C. (after recrystallization from light petroleum); the neutral oxalate melted with decomposition at 167° C. after recrystallization from a mixture of methanol and ethanol.

Example 9

3-dimethylamino-1-(2'-pyridyl)-1-(2'-thienyl)propan-1-ol (5 g.) was added in portions to 80% aqueous sulphuric acid (10 ml.) and the solution then heated in the steam bath for 10 minutes. The solution was cooled, diluted with water, basified and the product extracted with ether, and purified by distillation under reduced pressure. 3-dimethylamino-1-(2'-pyridyl)-1-(2'-thienyl)-prop-1-ene boiled at 116–122° C./0.5 mm. and the neutral oxalate prepared therefrom melted at 161–162° C. with decomposition.

Example 10

Beta-dimethylamino-parachloropropiophenone when reacted with 2-pyridyllithium in a manner essentially similar to that described in Example 1 yielded 3-dimethylamino-1-(4'-chlorophenyl)-1-(2''-pyridyl)-propan-1-ol, melting point 89–90° C. after recrystallization from ethanol.

The beta-dimethylamino-parachloropropiophenone (M. P. 58–59°) was prepared by the Mannich reaction from parachloroacetophenone, formaldehyde and dimethylamine; the hydrochloride melts at 174–175°.

Example 11

Dehydration of 3-dimethylamino-1-(4'-chlorophenyl)-1-(2''-pyridyl)-propan-1-ol by the method described in Example 9 gave 3-dimethylamino-1-(4'-chlorophenyl)-1-(2''-pyridyl)-prop-1-ene which boiled at 118–120° C./0.01 mm. The oxalate prepared therefrom melted with decomposition at 171° and the maleate at 165–166° with decomposition.

Example 12

Beta - N - pyrrolidino - parachloropropiophenone, when reacted with 2-pyridyllithium in a manner essentially similar to that described in Example 1, yielded 3-N-pyrrolidino - 1 - (4' - chlorophenyl) - 1 - (2'' - pyridyl) - propan-1-ol, melting point 130–131° C. after recrystallization from ethanol.

The beta - N - pyrrolidino - parachloropropiophenone (M. P. 71–72°) was prepared by the Mannich reaction from parachloropropiophenone, formaldehyde and pyrrolidine; the hydrochloride melts at 185–186°.

Example 13

Dehydration of 3-N-pyrrolidino-1-(4'-chlorophenyl)-1-(2''-pyridyl)propen-1-ol, by the method described in Example 9, gave 3 - N - pyrrolidino-1-(4'-chlorophenyl)-1-(2''-pyridyl)-prop-1-ene which had a boiling point of 158–160°/0.01 mm. The oxalate prepared therefrom melted at 177° with decomposition.

Example 14

Treatment of the 3-N-pyrrolidino-1-(4'-chlorophenyl)-1-(2''-pyridyl)-prop-1-ene by the method of Example 3 yielded 3 - N - pyrrolidino - 1 - (4' - chlorophenyl) - 1 - (2''-pyridyl)-propane.

Example 15

Following the procedure of Example 3, 3-piperidino-1-(2'-pyridyl)-1-p-chlorophenylprop-1-ene was reduced to 3-piperidino-1-(2'-pyridyl)-1-p-chlorophenylpropane.

Example 16

3 - dimethylamino - 1 - (4' - methoxyphenyl) - 1 - (2' - pyridyl)-prop-1-ene was treated by the procedure of Example 3 to give 3-dimethylamino-1-(4'-methoxyphenyl)-1-(2'-pyridyl)propane.

Example 17

The method of Example 1 was followed using 2-bromopyridine and 3-diethylamino-p-chloropropiophenone to yield 3 - diethylamino - 1 - (2' - pyridyl) - 1 - p - chlorophenylpropan-1-ol.

Example 18

The compound of Example 17 was reduced by the method of Example 2 to form 3-diethylamino-1-(2'-pyridyl)-1-p-chlorophenylprop-1-ene.

Example 19

The allylamine of Example 18 was treated with palladized charcoal catalyst and hydrogen by the method of Example 3 to produce 3-diethylamino-1-(2'-pyridyl)-1-p-chlorophenylpropane.

I claim:

1. As a new compound a substance of the class consisting of the free base and non-toxic acid addition salts, said substance being represented by the formula

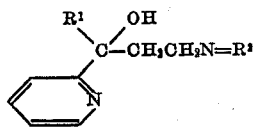

wherein $R^1$ is a radical selected from the class consisting of phenyl, p-chlorophenyl and p-methoxyphenyl radicals and $NR^2$ is a radical selected from the class consisting of the dimethylamino, diethylamino, pyrrolidino and piperidino radicals.

2. The method of making aminocarbinol compounds of the general formula

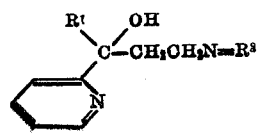

wherein $R^1$ is a radical selected from the class consisting of phenyl, p-chlorophenyl and p-methoxyphenyl radicals and $NR^2$ is a radical selected from the class consisting of the dimethylamino, diethylamino, pyrrolidino and piperidino radicals, which process comprises reacting an aminoethyl ketone of the formula $R^1COCH_2CH_2N=R^2$ wherein $R^1$ and $R^2$ have the above mentioned values with 2-pyridyl lithium and hydrolyzing the organo-lithium compound so formed to liberate the aminocarbinol.

3. As a new compound 3-dimethylamino-1-(4'-chlorophenyl)-1-(2''-pyridyl)-propan-1-ol.

4. As a new compound 3-N-pyrrolidino-1-(4'-chlorophenyl)-1-(2''-pyridyl)-propan-1-ol.

5. As a new compound 3-diethylamino-1-(2'-pyridyl)-1-p-chlorophenylpropan-1-ol.

6. A salt of 3-dimethylamino-1-(4'-chlorophenyl)-1-(2''-pyridyl)-propan-1-ol.

7. As a new compound a salt of 3-N-pyrrolidino-1-(4'-chlorophenyl)-1-(2''-pyridyl)-propan-1-ol.

8. As a new compound a substance of the class consisting of the free base and non-toxic acid addition salts, said substance being represented by the formula

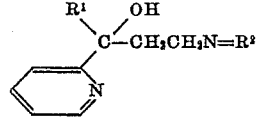

wherein $R^1$ is a phenyl radical and $NR^2$ is a radical selected from the class consisting of the dimethylamino, diethylamino, pyrrolidino and piperidino radicals.

9. The method of making aminocarbinol compounds of the general formula

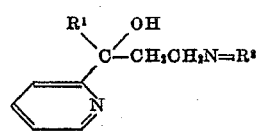

wherein $R^1$ is a phenyl radical and $NR^2$ is a radical selected from the class consisting of the dimethylamino, diethylamino, pyrrolidino and piperidino radicals, which process comprises reacting an aminoethyl ketone of the formula $R^1COCH_2CH_2N=R^2$ wherein $R^1$ and $R^2$ have the above mentioned values with 2-pyridyl lithium and hydrolyzing the organolithium compound so formed to liberate the aminocarbinol.

References Cited in the file of this patent

UNITED STATES PATENTS

| Number | Name | Date |
|---|---|---|
| 1,978,539 | Klarrer et al. | Oct. 30, 1934 |
| 1,980,638 | Scheuing et al. | Nov. 13, 1934 |
| 2,282,907 | ter Horst | May 12, 1942 |
| 2,344,814 | Grun et al. | Mar. 21, 1944 |
| 2,411,664 | Miescher et al. | Nov. 26, 1946 |
| 2,441,069 | Hoffman et al. | May 4, 1948 |

FOREIGN PATENTS

| Number | Country | Date |
|---|---|---|
| 11,197 | Great Britain | of 1906 |
| 240,363 | Switzerland | May 16, 1946 |
| 695,640 | Germany | Aug. 29, 1940 |

OTHER REFERENCES

Burger et al., Jour. Amer. Chem. Soc., vol. 66 (1944), pp. 1327–28.